Nov. 24, 1925.
Re. 16,216
O. H. PIEPER ET AL
UNITARY DENTAL APPARATUS
Original Filed Sept. 5, 1917 5 Sheets-Sheet 1
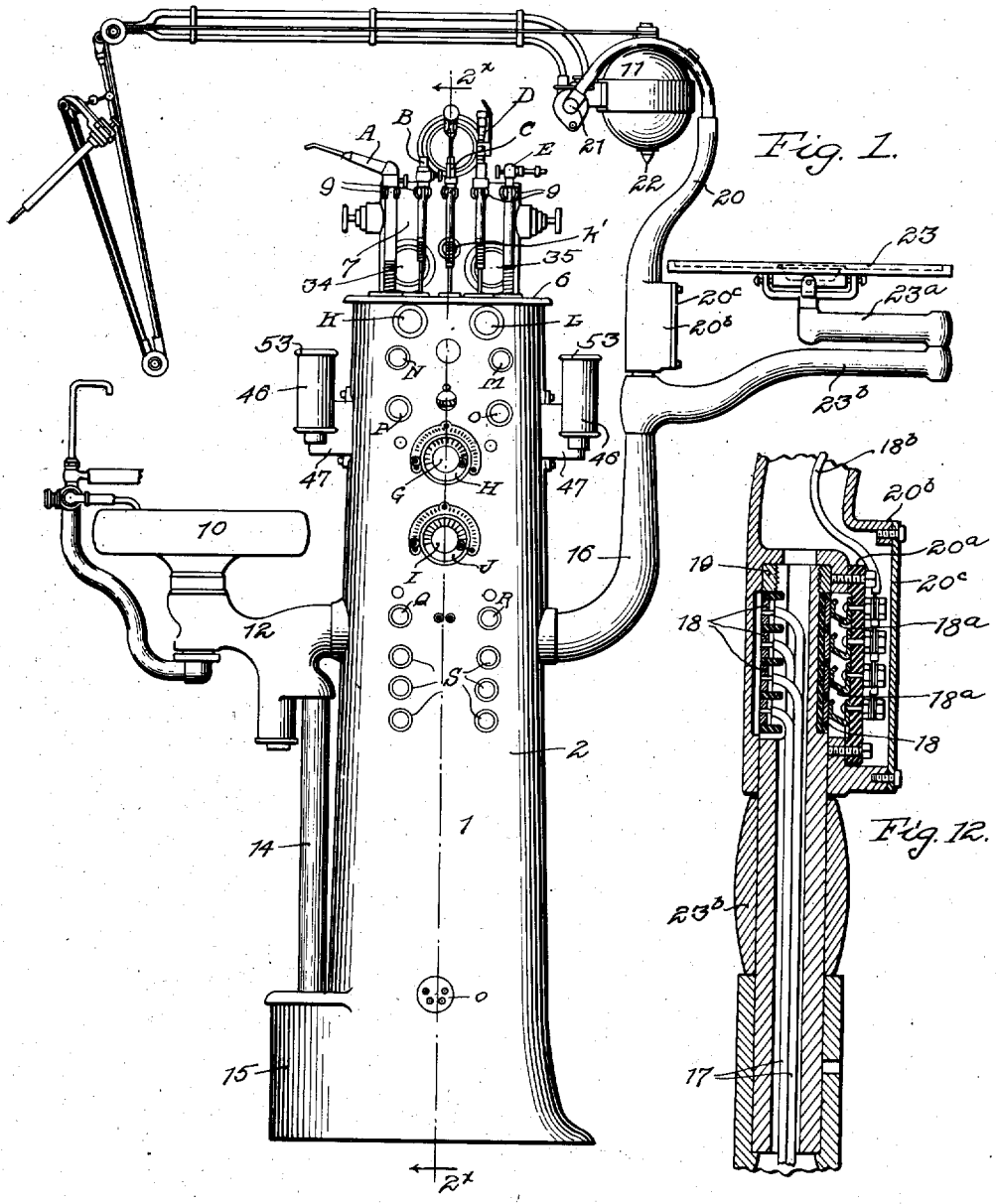
Inventors
Oscar H. Pieper
Alphonse F. Pieper
By Brown, Boettcher & Dienner
Attorneys.

Nov. 24, 1925.
Re. 16,216
O. H. PIEPER ET AL
UNITARY DENTAL APPARATUS
Original Filed Sept. 5, 1917 5 Sheets-Sheet 2
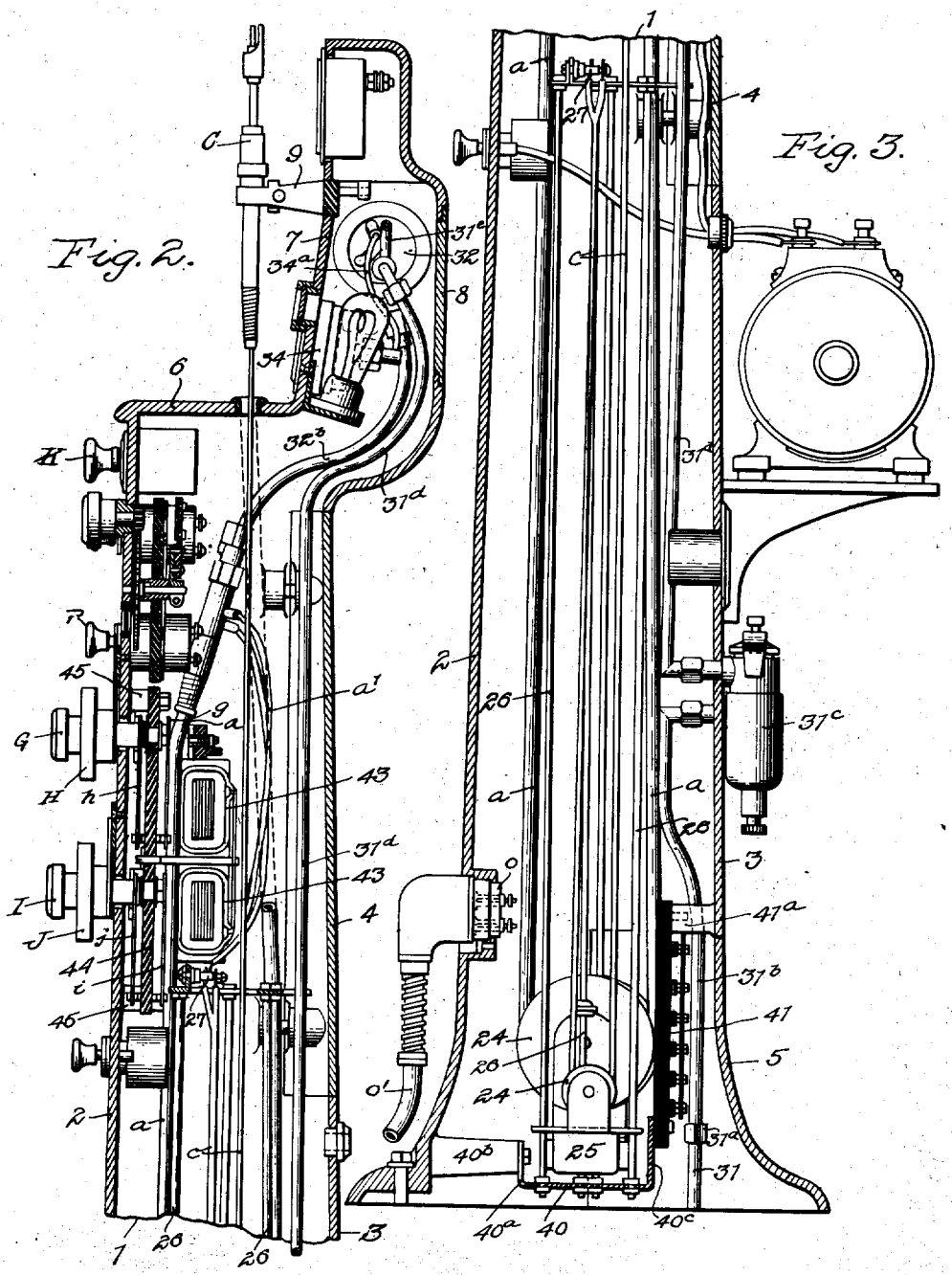
Inventors
Oscar H. Pieper
Alphonse F. Pieper
By Brown, Boettcher & Dienner
Attorneys.

Nov. 24, 1925.

Re. 16,216

O. H. PIEPER ET AL

UNITARY DENTAL APPARATUS

Original Filed Sept. 5, 1917 5 Sheets-Sheet 3

Inventors
Oscar H. Pieper
Alphonse F. Pieper
By Brown, Goettcher & Dienner
Attorneys.

Nov. 24, 1925. Re. 16,216

O. H. PIEPER ET AL

UNITARY DENTAL APPARATUS

Original Filed Sept. 5, 1917 5 Sheets-Sheet 4

Inventors
Oscar H. Pieper
Alphonse F. Pieper
By Brown, Coettcher & Diemer
Attorneys.

Nov. 24, 1925. Re. 16,216

O. H. PIEPER ET AL

UNITARY DENTAL APPARATUS

Original Filed Sept. 5, 1917 5 Sheets-Sheet 5

Inventors
Oscar H. Pieper
Alphonse F. Pieper
By Brown, Boettcher & Dienner
Attorneys.

Reissued Nov. 24, 1925. Re. 16,216

UNITED STATES PATENT OFFICE.

OSCAR H. PIEPER AND ALPHONSE F. PIEPER, OF ROCHESTER, NEW YORK.

UNITARY DENTAL APPARATUS.

Original No. 1,376,356, dated April 26, 1921, Serial No. 189,825, filed September 5, 1917. Application for reissue filed September 17, 1925. Serial No. 57,013.

*To all whom it may concern:*

Be it known that we, OSCAR H. PIEPER and ALPHONSE F. PIEPER, both of Rochester, in the county of Monroe and State of New York, have invented certain new and useful Improvements in Unitary Dental Apparatus; and we do hereby declare the following to be a full, clear, and exact description of the same, reference being had to the accompanying drawings, forming a part of this specification, and to the reference numerals thereon.

Our invention has for its object to provide an apparatus for the use of dentists which will facilitate the performance of various operations, in which it is intended to bring numerous instruments and pieces of mechanism, which a dentist is called upon to use most frequently, nearest at hand. With this end in view we have provided a unitary structure in which various appliances are assembled in juxtaposition and mounted upon a column, or standard, which may be located within easy reach of the operator's position at the side of the dental chair, said standard having certain novel features of construction whereby the electrical apparatus, such as the dental motor, and control circuits thereof, and other mechanisms, are associated conveniently with the mouth instruments, comprising the hot air syringe, mouth mirrors and cautery, and the low voltage devices employed for supplying current thereto together with the operating means therefor. To these and other ends the invention consists in certain improvements and combinations of parts, all as will be hereinafter more fully described, the novel features being pointed out in the claims at the end of the specification.

In the drawings:

Figure 1 is a front elevation of a unitary apparatus constructed in accordance with our present invention;

Figs. 2 and 3 are enlarged vertical sectional views taken on the line $2^x$—$2^x$ of Fig. 1, the former showing the upper portion of the apparatus and the latter the bottom thereof;

Fig. 12 is a detail sectional view of the upper end of the motor supporting arm and the contacts in the motor circuit permitting the motor to be rotated.

Similar reference characters throughout the several drawings indicate similar parts.

To facilitate the work of a dentist we have brought into close relationship in a single apparatus those devices for which he has the most frequent use, and have assembled them on a support in the form of a column, in which the air pipes and cord circuits for the various instruments are concealed, as are also the circuit wires for the motor, and the water supply pipe for the cuspidor, this pipe, as well as the waste pipe, having union, or joint connections by means of which they may be attached to the service pipes of the building, arranged on the base of the column, where access may be conveniently had to them through a removable portion of the column. The hand instruments, such as the hot air syringe, the cautery, the examination lamp, and the air nozzle for the atomizers, are supported above the top of the column, and the air pipes and cord circuits for these various instruments are looped within the column. To this end the latter is made of sufficient height to provide loops in said cords of sufficient length to enable the apparatus to be located preferably at the left hand side of the operating chair in a position facing the operator, so that he may easily reach one or another of the instruments and carry it to the point of operation, irrespective of the adjustment of the dental chair itself.

Figure 6:
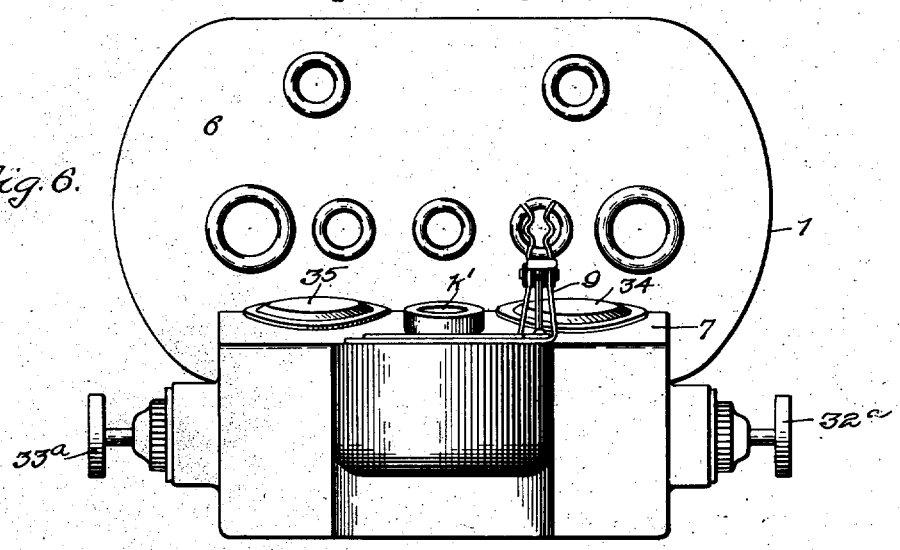
Fig. 6 is a top plan view of the column.
Figure 7:
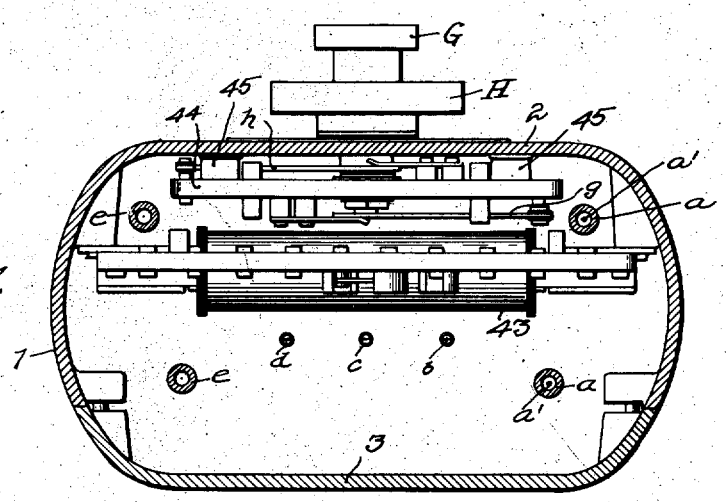
Fig. 7 is a horizontal sectional view taken on the line $7^x$—$7^x$ of Fig. 4.

The column, or pillar, indicated by 1, is preferably oval in cross section, as shown in Figs. 6 and 7, providing the parallel front and rear faces 2 and 3, the former carrying on its inner side of the various parts of the electrical apparatus which will be more fully described hereinafter, and the latter being provided with upper and lower openings which are normally closed by the removable panels 4 and 5. The column is provided at its top with the horizontal table portion 6, at the rear side of which is an upwardly extending offset top portion of the column comprising the front face 7 provided with a plurality of apertures, the side walls, and the rear wall having an aperture normally closed by the cover-plate 8. This offset portion provides a support for the air gages and certain devices indicating the electrical condition of the apparatus in a position where they can be observed by the operator at the moment an instrument is picked up or selected. A further function of the offset top portion is the provision of a support for clips, or holders, for the various instruments, as indicated by 9 (Figs. 2 and 6).

Figure 5:
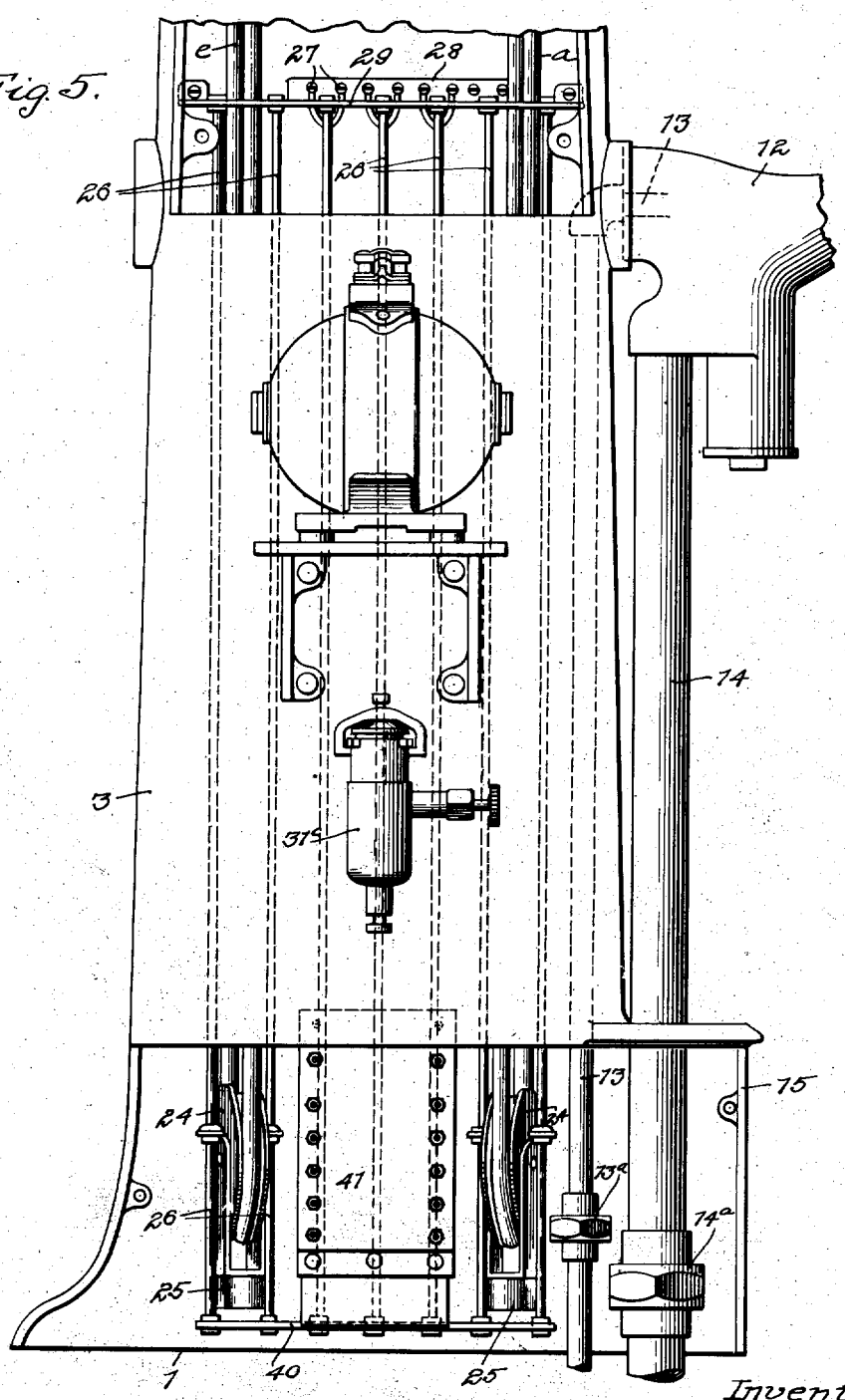
Fig. 5 is a similar view of the bottom half thereof.

The position which the column, or pillar, is intended to occupy with reference to the operating chair permits its further use as a support for the usual cuspidor 10, and dental engine, or motor 11, both of which are mounted upon hollow bracket arms, or supports, preferably disposed at opposite sides of the column, one arm thus serving to counterbalance the other. The arm which supports the cuspidor 10 is indicated by 12, and contains a water supply pipe 13 and the waste pipe 14, which may, or may not, be included wholly within the column. In Fig. 5 we have shown the supply pipe located in the column, and the waste pipe disposed exteriorly; but whichever way these pipes are arranged we prefer, for the sake of neatness and general appearance of the apparatus when set up, that the lower ends of these pipes be included within the column, and to this end a pedestal extension 15 is provided at one side for the accommodation of the unions, or pipe couplings, $13^a$ and $14^a$, as shown in Fig. 5.

The motor supporting arm, as indicated by 16, extends upwardly and contains a plurality of motor circuit wires 17 (Fig. 12), which terminate in a corresponding number of insulated contact rings 18, mounted on the reduced upper end of the arm, and held in place thereon by the nut 19. The member carrying motor 11, indicated by 20, is attached to the motor at its pivotal point of support, 21, and curves over the motor and extends downwardly and forwardly into the plane of the axis of the armature 22, thus maintaining the center of gravity in alinement with the arm 16, and minimizing any tendency of the member 20 to bind in its bearing. The member 20 is also hollow, and at its lower end fits over the cylindrical portion of the arm 16, formed by the contact rings 18, and contains a number of spring contacts, or brushes $18^a$, from which corresponding wires $18^b$ extend to the motor terminals. The brushes $18^a$ are mounted on an insulating plate $20^a$, contained in enlargement $20^b$ formed at the lower end of the member 20, which is closed by detachable plate $20^c$.

In order to support the various hand instruments which the dentist is required to use in the most accessible position we mount the rectangular instrument tray 23 on the jointed arms $23^a$ and $23^b$, and pivot the latter on the bracket 16, preferably at a point just below the end of the motor carrying member 20, as will be seen in Figs. 1 and 12.

Figure 8:
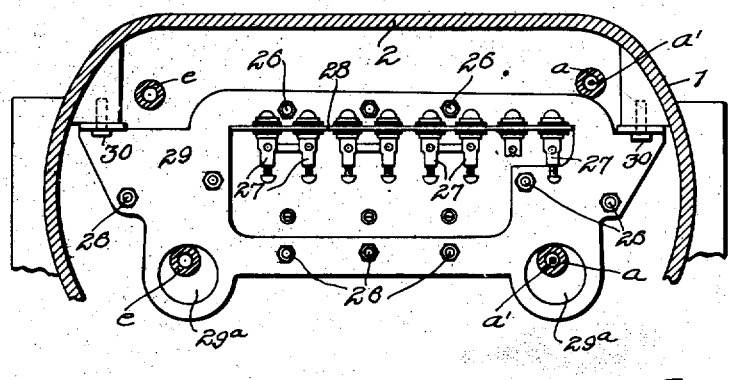
Fig. 8 is a similar view taken on the line $8^x$—$8^x$ of Fig. 4.

The particular selection of the air and electrically operated hand instruments which we prefer to provide, are a hot air syringe A, a cautery B, one hand piece C for miscellaneous detachable instruments, such as canal drier, antrum lamp, wax spatula, or bleacher point. The remaining instruments are the examination lamp D and the air nozzle E, which latter, it will be understood, is used in selective cooperation with one of the plurality of atomizers containing mouth washes or antiseptic solutions. The air pipes for the syringe A and the nozzle E and the cord circuits for syringe A, and the remaining instruments B, C and D enter apertures in the table 6, and are looped therein around suitable counter balances comprising pulleys 24, carrying weights 25 and traveling on the parallel guide rods 26. The inner ends of the cord circuits are attached to binding posts 27 (Fig. 8), carried on the flange 28 of a horizontal plate 29, which also comprises the support for the upper ends of the guide rods 26. The plate 29 is held in position by screws 30, which pass through ears on the plate and enter lugs formed within the column. The air pipes for the instruments A and E are indicated by *a* and *e* and the cord circuits for the instruments B, C and D are indicated respectively as *b*, *c* and *d*. The hot air syringe A, which also comprises an electrical element, has a cord circuit, the conductors of which pass interiorly through the pipe *a*. These conductors are indicated by *a'* in Fig. 2, and are shown as extending upwardly from the binding post 27 to the point of attachment of pipe *a* to the source of air supply.

Figure 4:
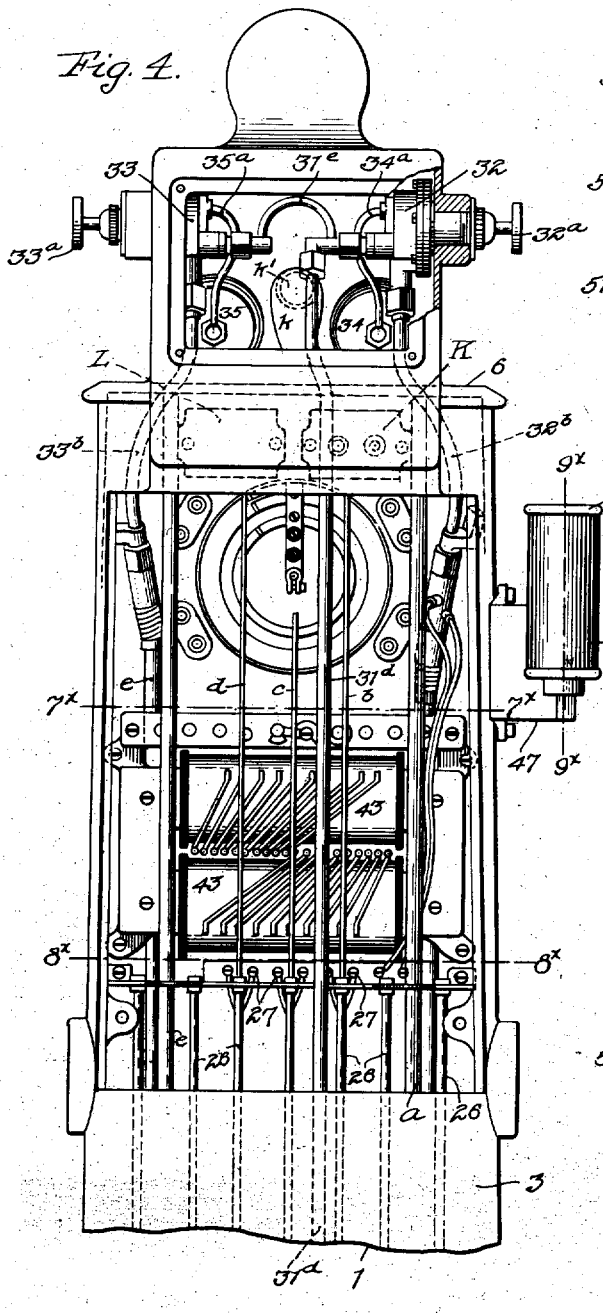
Fig. 4 is a detail rear elevation of the upper portion of the column, or pillar.

The air is supplied to the pipes *a* and *e* under pressure from a suitable reservoir (not shown) from which the pipe 31 passes into the bottom of the column, where it is provided with the union $31^a$, opposite the lower opening in said column. From this point the pipe continues upwardly as indicated by $31^b$, to a suitable filter $31^c$, preferably arranged exteriorly on the rear wall 3 of the column, so that the filtering medium therein may be easily replenished, as occasion requires. From the filter the pipe continues, as indicated by $31^d$, to the two regulating valves 32 and 33, connection with the latter being through a branch $31^e$. The valves 32 and 33 are mounted on the side walls of the offset top portion of the column and are provided with regulating knobs $32^a$ and $33^a$ respectively by means of which the higher air pressure may be reduced to the pressure which the operator may desire to use in operating instruments A and E. The flexible hose air pipes *a* and *e* are connected respectively with the outlet ports of the reducing valves, said connections being by means of the pipes $32^b$ and $33^b$, shown particularly in Figs. 2 and 4. The reducing valves 32 and 33 are arranged in the side walls of the offset portion of the column, and the air instruments A and E are located at the opposite ends of the row of instruments, so that the air pipes, because of their greater bulk, may be disposed near the sides of the column, the portions thereof leading downwardly from the air gages lying toward the front wall of the column, while the upwardly extending portions thereof lie toward the rear wall of the column. In their upper course the air pipes *a* and *e*, are guided in apertures $29^a$ formed in ears at the rear corners of the plate 29.

Separate air gages 34 and 35, corresponding to reducing valves 32 and 33 are fitted in two of the apertures in the front face 7 of the offset portion of the column. These gages are connected with their respective valves by pipes $34^a$ and $35^a$, and being adjacent the regulating valves and directly in rear of the air instruments they may be conveniently observed both when an instrument is selected and when the valve is regulated to increase, or decrease pressure. The lower ends of the guide rods 26, on which the counter balances for the cord circuits travel are supported by a plate 40, which is accessible through the opening at the base of the column. It is secured by an upwardly extending flange $40^a$ bolted to the lug $40^b$, and by a similar flange $40^c$, at its rearward edge bolted to the lower end of the circuit terminal board 41, the upper end of which is rigidly bolted to the ear $41^a$ projecting inwardly from the rear wall of the column above the lower opening.

The transformer which we have provided comprises primary coils and secondary coils 43 from which lead taps to switch terminals on a panel 44, which also supports the primary and secondary coils, and is attached permanently to studs 45 on the inner front face 2 of the column. Extending through the latter are the concentrically arranged switch operating members G and H and I and J attached to the inner and outer switch arms *g*, *h* and *i*, *j* respectively. The switches G, H, I and J control the voltage of current flowing through the cord circuits leading to the instruments A, B, C and D.

The main, or master switch, is indicated by K, which, it will be seen, in Fig. 1, occupies the upper left hand location on the column just below the top 6. The main line conductors lead from the terminal board 41 to the master switch. By closing its contacts all the other portions of the apparatus are rendered serviceable, and by opening them the operator is assured that all current to the apparatus has been cut off. To afford a visual indication of the condition of the electrical apparatus the pilot light *k* is provided and associated with the switch K so that when the latter is closed the light is illuminated. The pilot lamp is preferably located in the top portion of the column in the rear of the aperture *k'* in the front wall 7, which, in Fig. 1, will be observed is between the gages 34 and 35. When the switch K is operated to the closed position the other apparatus may be brought into circuit by closing additional switches, the one for the low voltage instruments being indicated by L. Other switches in the order which they appear, reading downwardly on Fig. 1 are as follows: M for an ionization circuit; N, for the plug to which a fan, or an extra motor may be attached; O, for closing the circuit of the dental engine, or motor 11, in conjunction with the usual foot controller attached at *o* by means of the cable *o'*; P, a circuit for the bottle heaters; Q and R, are each switches which control circuits which may be idle and are provided for the accommodation of additional apparatus which the operator may wish to control from the column. A number of fuse plugs S, indicated diagrammatically, are inserted at necessary points, and in Fig. 1 are shown as being accessible at the front of the column for convenience in replacing them when occasion requires.

Figure 9:
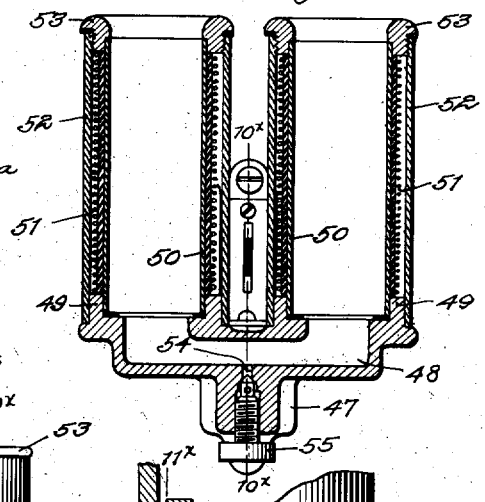
Fig. 9 is a detail cross-sectional view taken on the line $9^x$—$9^x$ of Fig. 4 illustrating the heaters for atomizer bottles.
Figure 10:
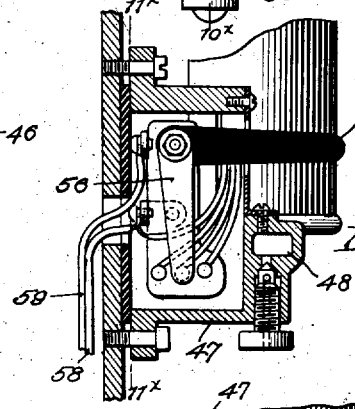
Fig. 10 is a detail illustration of the switch mechanism for the circuit of said heaters on the line $10^x$—$10^x$ of Fig. 9.
Figure 11:
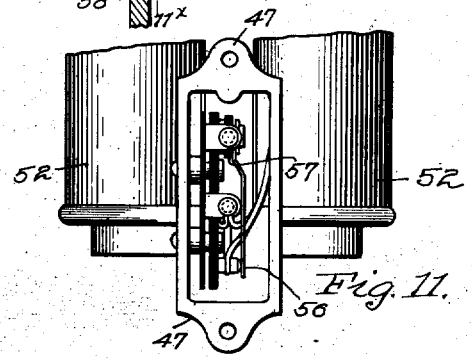
Fig. 11 is a rear view taken on the line $11^x$—$11^x$ of Fig. 10.

The assembled apparatus also embodies heaters 46, preferably arranged in pairs at opposite sides of the column, which are adapted to receive atomizer bottles, as will be understood. In Figs. 9, 10 and 11, the detail construction of one of these pairs of heaters is shown, comprising a bracket 47 having at its outer edge a laterally extending hollow arm 48, provided with collars 49 within which are fitted sleeves 50 provided with insulation and carrying the resistance windings 51, which comprises the heating elements. The latter are surrounded by sheaths 52, which are united at their upper ends with the inner sleeves 50 by a collar 53. The opening in the arm 48 communicates with the interior of the heater, and leading therefrom is an opening 54, closed by a screw plug 55, which can be opened to drain the heater in the event fluid, or moisture, accumulates therein. The flow of current through the heating coils 51 is controlled by a switch having three terminal points as shown, with which cooperates a switch arm 56, adapted to be adjusted by handle 57 which projects outwardly between the pair of heater cups. One end of the heating coil of each cup is connected by a wire 58 to one pole of switch P and wiper 56 is connected by the wire 59 with one pole of the master switch K.

The present invention provides a means of locating in a most compact manner the low voltage electric instruments, air instruments and control devices for each, together with the high voltage apparatus, such as the dental motor, and such other mechanisms as the dentist may wish to use, in a most convenient and accessible form, all combined into a unitary structure capable of adjustment as a whole at the side of the operating chair.

We claim as our invention:

1. An assembled dental apparatus, comprising a hollow column, a plurality of mouth instruments located above the column each having an electric device, separate cord circuits for said devices looped within the column and having means for yieldingly retracting them, a voltage control device mounted within the column having circuit connections with said cords, and operating means for said voltage control device extending exteriorly of the column below the mouth instruments.

2. An assembled dental apparatus comprising a hollow column having a set-back face and shelf at its upper end, mouth instruments normally positioned in front of said face each having an electric device, a voltage control device within the column having an operating member projecting exteriorly of the column, cord circuits looped within the column and extending from said voltage device through said shelf to the electric devices of the several instruments and means projecting forwardly from said set-back face for supporting the instruments when not in use.

3. An assembled dental apparatus comprising a hollow column having a top portion offset rearwardly and provided with apertures in its front face, a voltage control device within the column having a control member projecting from the forward side of the column, a source of air pressure within the latter, a gage connected to said source and mounted in one of the apertures in said offset top, a pilot lamp adapted to be lighted when the voltage device is in use and located opposite another of said apertures, an air operated mouth instrument having an electric heating element located in front of the offset top, an air pipe leading from the source of air pressure to the instrument and looped within the column and a circuit leading from the voltage control device to the heating element.

4. In an assembled dental appliance, the combination with a hollow column substantially oval in cross section having its rear wall provided with upper and lower openings, closures therefor, a voltage control device comprising mounting members secured to the inside of the front wall opposite the upper opening and having operating members extending through the front wall, a circuit terminal board located within the pedestal and accessible through the lower opening and having circuit connections with said voltage control device, guides extending vertically within the column and upper and lower supports therefor accessible through the corresponding column openings, a plurality of mouth instruments disposed above the column each having an electric device, separate cord circuits looped within the column and connecting said devices with the voltage control device, and counterbalances traveling on the guides and cooperating with the cords.

5. An appliance for dentists' use comprising a hollow column provided with a base opening, hollow bracket arms thereon respectively supporting a dental motor and a cuspidor, water supply and waste pipes for the latter leading to its bracket arm and each having pipe unions accessible through said opening in the column, a circuit wire terminal board within the column also accessible through said opening and circuit connections for the motor leading upwardly within the column and through the motor supporting bracket.

6. An apparatus of the character described, comprising a hollow column composed of a main portion and an offset top portion comprising front and side walls provided with apertures, a series of air and electrical mouth instruments disposed transversely above the column in front of the top portion, the air instruments flanking the electrical instruments, a source of air supply, pressure gages and pressure reduction valves mounted, respectively, on the front and side walls of said top portion connected with the source of air supply, air pipes connecting them with the air instruments extending within the column at opposite sides thereof, of voltage control device mounted within the column and supported on its front wall between said air pipes, and cord circuits connecting the electrical instruments and voltage control device.

7. An apparatus of the character described, comprising a hollow column having an apertured top wall, a series of air and electrical mouth instruments disposed transversely above the top wall, the air instruments flanking the others, a voltage control device supported within the column in spaced relation to the walls thereof, cord circuits leading from said devices through apertures in the top wall to the electrical instruments and disposed centrally within the column and leading upwardly therefrom through apertures in the top wall and connected to the electrical instruments, and air pressure pipes passing downwardly at the sides of the column, between the front wall and the voltage control device and upwardly in rear of the latter through apertures in the top of the column to said air instruments.

8. A standard for dental instruments comprising an upright hollow support, a bracket arm for supporting a motor and instrument tray on one side of the support, a bracket for a cuspidor on the other side of the support, a plurality of instrument supports adjacent the top of said support, a water supply pipe leading to said cuspidor, and electrical conductors leading to said motor and instruments, said supply pipe and conductors being concealed within the hollow support.

9. A dental equipment stand comprising a hollow support, a voltage controlling switch carried by and mounted within said support, electrical conductors leading through said support to said switch, an electrically operated instrument, means for mounting said instrument exteriorly of said support, a cord circuit normally housed within said support and connecting said instrument with said switch, said switch controlling the connections to said instruments to regulate the voltage impressed thereon, and operating means for said switch exterior of said support.

10. A dental equipment stand adapted to rest upon the floor comprising a hollow support, a switchboard carried by said support, electrical conductors leading through said support to said switchboard, a plurality of electrically operated instruments, means for mounting said instruments upon said support exteriorly thereof, cord circuits connecting said instruments with said switchboard, and means in said switchboard selectively to control the connections to said instruments.

11. A dental equipment stand comprising a hollow support, a switchboard carried by said support, electrical conductors leading through said support to said switchboard, a plurality of electrically operated instruments, means for mounting said instruments upon said support exteriorly thereof, cord circuits connecting said instruments with said switchboard, means in said switchboard selectively to control the connections to said instruments, a cuspidor carried by said support, and a water supply pipe passing through said support and leading to said cuspidor.

12. A dental equipment stand comprising a pedestal adapted to rest upon the floor, a dental motor carried by said pedestal, a plurality of electrically operated instruments, cord circuits connecting said instruments with said switchboard, means for carrying said instruments upon said pedestal and a cuspidor carried by said pedestal.

13. A dental equipment stand comprising a spittoon and a part embodying a switchboard, supported by a pedestal, electrical connecting means in the lower portion of said pedestal, connections from said connecting means through said pedestal to said switchboard, a plurality of instruments connected with said switchboard, and means on said first named part arranged to selectively control said instruments.

14. A dental equipment stand comprising a support, an air syringe adapted to be mounted on said support, an air tube leading through said support to said air syringe, electrical heating means associated with said syringe, a switchboard carried by said support, a switch and a regulating coil in said switchboard connected with said electrical heating means, and electrical conductors leading through said support to said switchboard.

15. In a dental equipment, in combination, a support, a plurality of dental instruments including an air nozzle mounted exteriorly upon said support, means including normally housed flexible conductors for supplying electric current and air to said instruments, heater elements carried externally by said support and adapted to be connected with said current supplying means, and atomizer bottles for cooperation with said air nozzle adapted to be removably associated with said heater elements.

16. A dental equipment stand comprising a pedestal, a switchboard and spittoon, and a plurality of implements operatively connected with said switchboard by flexible connectors normally housed within said pedestal, but permitting the free withdrawal of said implements.

In witness whereof, we have hereunto set our hands at Rochester, New York, this 11th day of September, A. D. 1925.

OSCAR H. PIEPER.
ALPHONSE F. PIEPER.